United States Patent [19]

Jinnai

[11] Patent Number: 4,499,475
[45] Date of Patent: Feb. 12, 1985

[54] INK JET PRINTING APPARATUS

[75] Inventor: Koichiro Jinnai, Tokyo, Japan

[73] Assignee: Ricoh Company, Ltd., Tokyo, Japan

[21] Appl. No.: 319,520

[22] Filed: Nov. 9, 1981

[30] Foreign Application Priority Data

Nov. 25, 1980 [JP] Japan ............................ 55-165575

[51] Int. Cl.³ .......................................... G01D 15/18
[52] U.S. Cl. .................................................... 346/75
[58] Field of Search ............. 346/75, 140 PD, 140 IJ, 346/140 R

[56] References Cited

U.S. PATENT DOCUMENTS

| | | | |
|---|---|---|---|
| 3,769,630 | 10/1973 | Hill et al. | 346/75 |
| 4,119,973 | 10/1978 | Stager | 346/75 |
| 4,171,527 | 10/1979 | Osborne et al. | 346/75 |
| 4,286,273 | 8/1981 | Horike | 346/140 IJ |
| 4,318,480 | 3/1982 | Lombardo et al. | 346/75 |

Primary Examiner—E. A. Goldberg
Assistant Examiner—Todd E. DeBoer
Attorney, Agent, or Firm—David G. Alexander

[57] ABSTRACT

An ink jet printing apparatus is disclosed in which, upon an accidental change in the direction of ink ejection to an uncontrollable range caused by ink set in a nozzle of its head or dust particles deposited thereon, ink ejection from the nozzle is interrupted immediately to avoid electric discharge and other possible accidents. An alarm representing such a failure may be produced simultaneously with the interruption of ink ejection.

7 Claims, 5 Drawing Figures

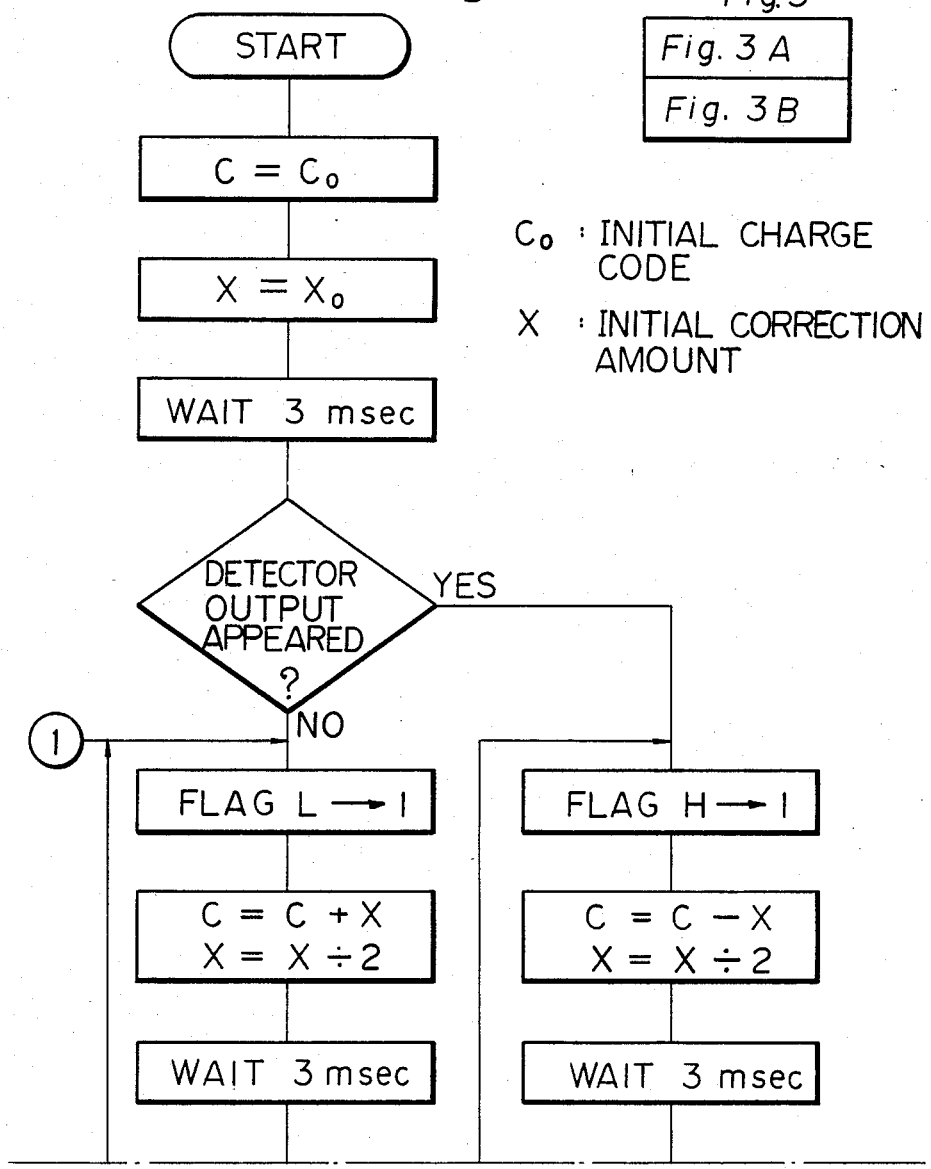

INK JET PRINTING APPARATUS

BACKGROUND OF THE INVENTION

The present invention relates to an ink jet printing apparatus which includes an ink jet head for ejecting ink under supersonic vibration from its nozzle, a charging electrode for selectively charging droplets of ink at a position where the droplets become separated successively from the stream of ejected ink, and deflection electrodes for deflecting charged ink droplets to cause them into impingement on a sheet of paper.

In an ink jet printer of the type described, ink in the nozzle of the ink jet head tends to set as after a long time of suspension of operation of the printer. Setting of ink in the nozzle results in deviation of the direction of ink ejection to an unusual or uncontrollable range when the printer is operated after the suspension. Another cause of such deviation in the direction of ink ejection is constituted by dust particles and the like which might be deposited on the wall of the nozzle. Once out of expected bearings, ink droplets would impinge on the charging electrode and/or deflection electrodes to invite various accidents such as electric discharge.

When a voltage pulse fails to be coupled to the charging electrode in properly timed relation to the formation of an ink droplet due to clogging of the nozzle, the ink droplet cannot be deposited with a desired amount of electrostatic charge and, therefore, prints a dot on the paper sheet in a position offset from expected one. Such dislocated ink droplets would disturb the reproduction of a desired image on the paper sheet. With this in view, it has been customary to determine a proper timing for applying a voltage pulse to the charging electrode after a search of a proper charging phase for an ink droplet. A critical drawback of this system is that the detection of an accidental change in the direction of ink ejection is impossible or, if not impossible, incomplete though satisfactory to determine whether the charge timing is proper.

SUMMARY OF THE INVENTION

It is an object of the present invention to preclude the drawbacks inherent in the prior art ink jet printers discussed hereinabove.

It is another object of the present invention to provide an ink jet printing apparatus which is capable of detecting any accidental change in the direction of ink ejection.

It is another object of the present invention to provide an ink jet printing apparatus in which, upon a change in the direction of ink ejection to an uncontrollable range as a result of clogging of the nozzle of its head, an alarm is produced and ink ejection from the nozzle is stopped immediately in order to avoid electric discharge and other accidents heretofore experienced.

It is another object of the present invention to provide a generally improved ink jet printing apparatus.

Other objects, together with the foregoing, are attained in the embodiment described in the following description and illustrated in the accompanying drawings.

BRIEF DESCRIPTION OF THE DRAWINGS

FIG. 3, 3A and 3B is a flowchart demonstrating an operation of the drive circuit shown in FIG. 2.

DESCRIPTION OF THE PREFERRED EMBODIMENT

While the ink jet printing apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
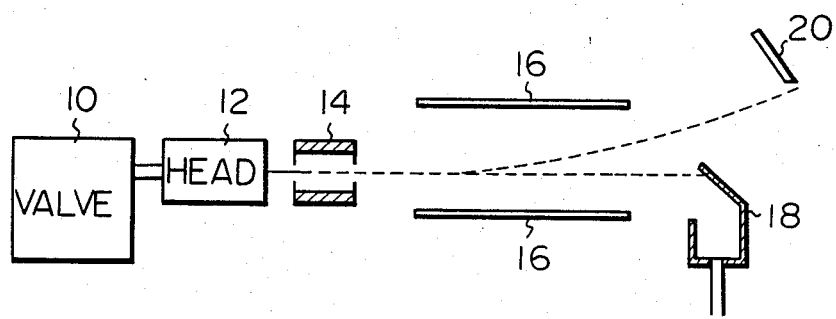
FIG. 1 is a schematic diagram showing an ink jet printing apparatus embodying the present invention.

Referring to FIG. 1 of the drawings, the ink jet printer includes an ink jet head 12 which is supplied with ink under pressure from a pump (not shown) via an electromagnetic valve 10. The ink jet head 12 drives the pressurized ink and ejects it from its nozzle. The stream of ink from the head 12 is transformed into a string of ink droplets, selectively charged by a charging electrode 14 and then deflected by deflection electrodes 16 to impinge on a sheet of paper (not shown). Non-charged ink droplets are not deflected but collected in a gutter 18 to be excluded from printing actions on the paper sheet. The printer of FIG. 1 is furnished with an electrode 20 for the detection of a deflection of an ink droplet. This electrode 20 also serves to detect an accidental change in the direction of ink ejection through impingement of a charged ink droplet thereon as will be described.

Figure 2:
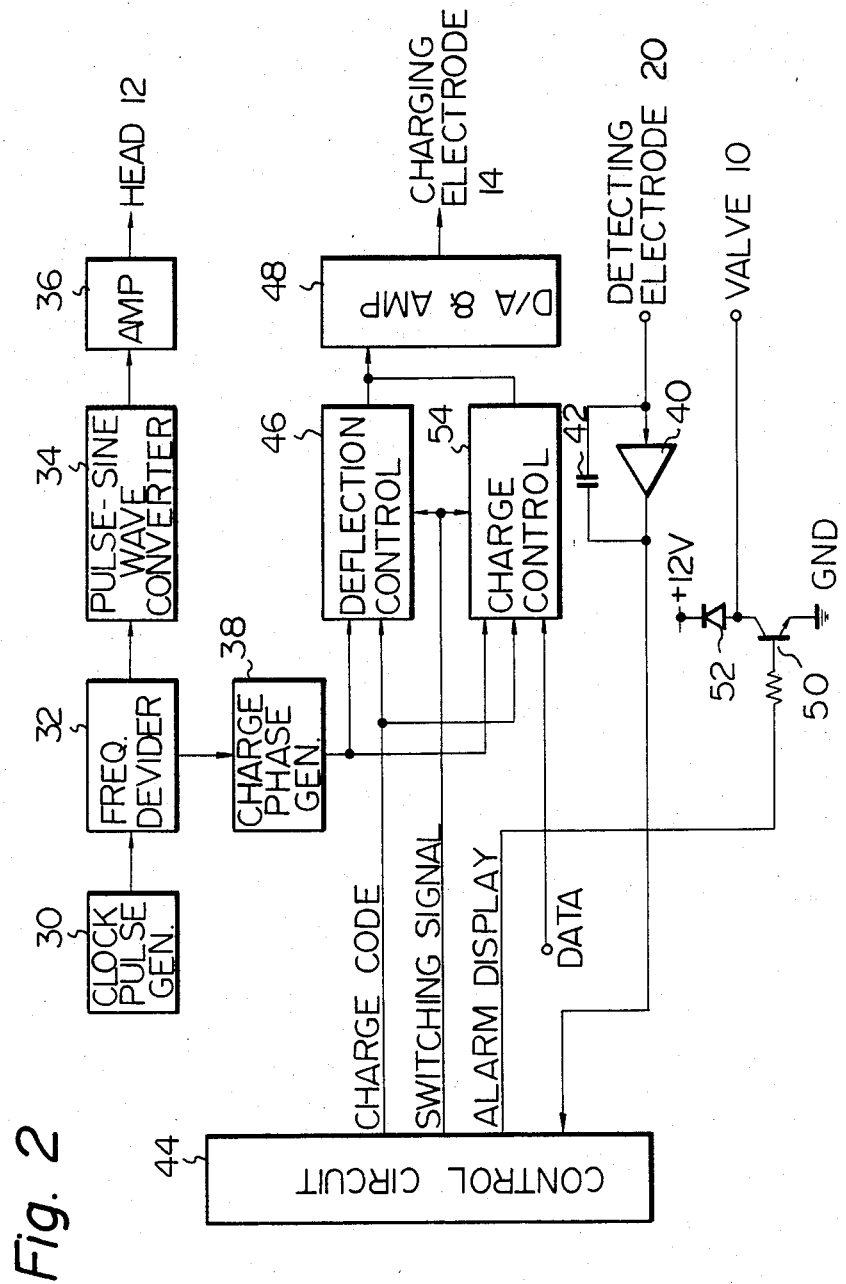
FIG. 2 is a block diagram of a drive circuit for driving the ink jet printer of FIG. 1.

Referring to FIG. 2, there is shown a drive circuit for operating the ink jet printer of FIG. 1. The output signal of a clock pulse generator 30 is divided by a frequency divider 32 to provide a train of repetitive pulses of a 132 KHz frequency. This pulse train is transformed by a pulse-to-sine wave converter 34 into a sinusoidal wave which is then amplified by an amplifier 36. The output of the amplifier 36 is coupled to the ink jet head 12 of FIG. 1 so as to drive it. Meanwhile, a charging pulse generator 38 prepares charging pulses of a frequency one half the frequency of the 132 KHz pulse signal. Though optional, the charge pulse generator 38 is adapted to cause guard drops to intervene between adjacent charged ink droplets.

Figure 3B:
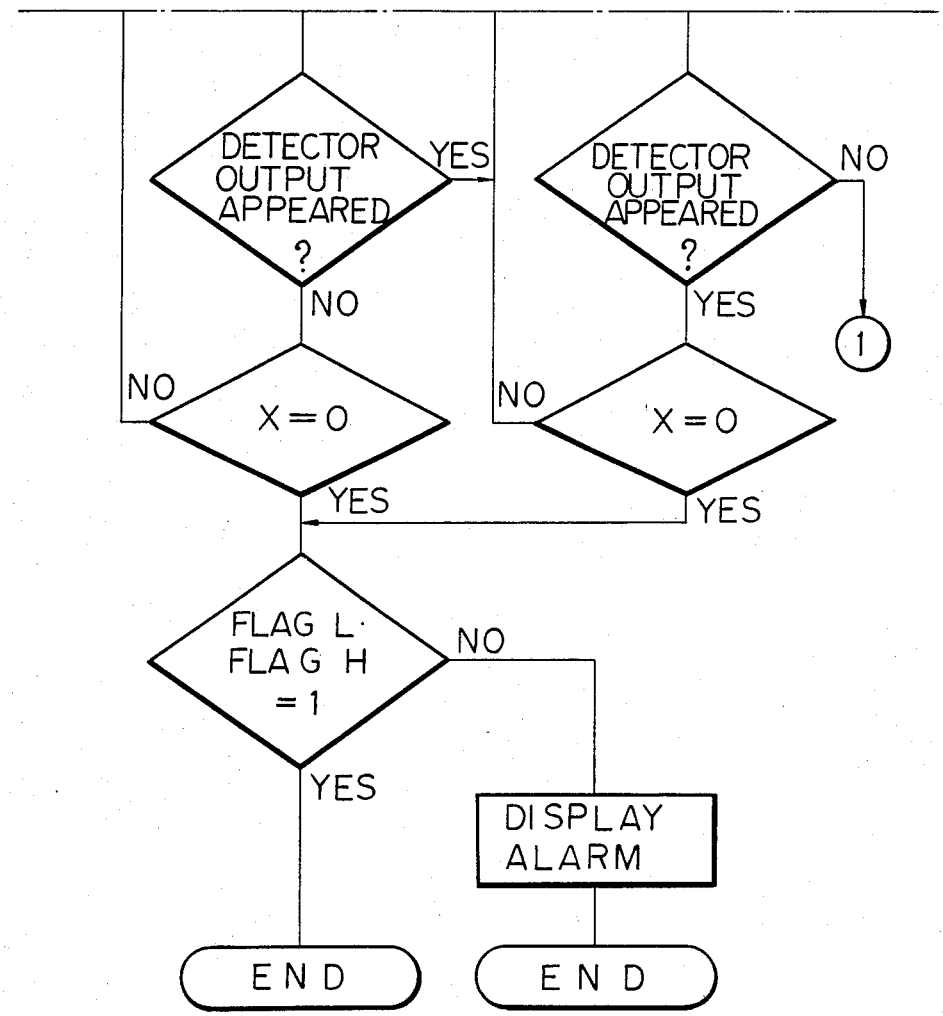

Reference will now be made to the flowchart of FIG. 3 for describing a procedure from the delivery of an output signal of the deflection detector electrode 20 to the detection of a change in the direction of ink ejection.

The detector electrode 20 is connected with an integration circuit which is made up of an amplifier 40 and a capacitor 42. A control circuit 44 constituted by a microcomputer receives an output of the integrator to determine whether a charged ink droplet has impinged on the detector electrode 20. In the control circuit 44, a C-register is loaded wth an initial charge code ($C_0$) such as a hexadecimal code "618" and, then, an X-register is loaded with an initial correction amount of charge ($X_0$) such as a hexadecimal code "20". The initial charge code is supplied from the C-register to a deflection control circuit 46 and therefrom to the charging electrodes 14 via a digital-to-analog converter and amplifier network 48. In response to the output of the network 48, the charging electrodes 14 deposites an electrostatic charge on an ink droplet. Upon the lapse of 3 milliseconds, the control circuit 44 determines whether the charged ink droplet has impinged on the detector electrode 20, that is, whether the detector electrode 20 has produced an output. It will be noted that the interval of 3 milliseconds is employed in due consideration of the charge-up time plus flying time of an ink droplet.

If the output of the detector electrode 20 is present indicating that the charged ink droplet has impinged thereon, a flag H of the control circuit 44 becomes "1" so that the correction amount X is subtracted from the charge code C to produce the difference (C−X) and, at the same time, the correction amount X is reduced to X/2. This lowers the charge voltage and thereby the deflection of an ink droplet. Such a procedure is repeated as long as the output of the detector electrode 20 is present. If the presence of the output of the detector electrode 20 lasts even when the correction amount X has reached zero, a flag L of the control circuit 44 does not become "1" whereby AND of the flags L and H is made zero. A transistor 50 is thus rendered conductive to energize a light emitting diode 52 which provides an alarm display.

If on the other hand the output of the detector electrode 20 is absent indicating that the charged ink droplet has missed it, the flag L of the control circuit 44 becomes "1". Then, the correction amount X is added to the charge code C to increase the deflection of a charged ink droplet.

In this manner, deflected ink droplets progressively converge to the lower end of the detector electrode 20 to eventually define a reference deflection.

Suppose that the direction of ink ejection from the head 12 has deviated a great deal either laterally or downwardly due to stop-up of the nozzle. Under this condition, no ink droplet impinges on the detector electrode 20 whose output is therefore absent. This maintains the flag H "1" so that AND of the flags L and H is zero producing an alarm indicative of the stop-up. Likewise, the output of the detector electrode 20 is absent when the direction of ink ejection has greatly shifted upward out of the range of the detector electrode 20. This prevents the flag L from becoming "1" and produces an alarm due to the zero AND of the flags L and H. In either case, the collector output of the transistor 50 is coupled to the electromagnetic valve 10 in response to the alarm thereby deenergizing the valve 10 to stop ink ejection immediately. If the actual direction of ink ejection is coincident with predetermined one, AND of the flags L and H is "1" and the control signal 44 switches the alive circuit from the deflection control circuit 46 to a charge control circuit 54 with its switching output. Then, the drive circuit performs a charge control as under usual printing conditions.

In summary, it will be seen that the present invention provides an ink jet printing apparatus which is free from electric discharge or like accidents despite possible clogging of its nozzle with ink set therein or dust particles deposited thereon. Clogging of the nozzle would otherwise shift the direction of ink ejection to an uncontrollable range as has been described.

Various modifications will become possible for those skilled in the art after receiving the teachings of the present disclosure without departing from the scope thereof. For example, the alarm display may be omitted such that the output of the control circuit for interrupting ink ejection may be coupled directly to the electromagnetic valve.

What is claimed is:

1. An ink jet printing apparatus comprising:
   ink ejection means for ejecting and charging a jet of ink droplets;
   deflection means for electrostatically deflecting the jet by a variable amount;
   deflection detector means for detecting deflection of the jet to predetermined reference deflection and a direction of deviation of the jet from the reference deflection; and
   control means responsive to the detector means for controlling the deflection means to vary deflection of the jet toward the reference deflection in accordance with a sensed direction of deviation by progressively smaller amounts and terminating variation of the deflection when an amount of deflection variation has been reduced to a predetermined value, the control means comprising alarm means for producing an alarm signal when variation of the deflection has been terminated and the detector means does not detect the jet at the reference deflection.

2. An apparatus as in claim 1, in which the deflection detector means comprises a deflection detecting electrode.

3. An apparatus as in claim 2, in which the electrode is formed with an edge which defines the reference deflection.

4. An apparatus as in claim 1, further comprising alarm means which are energized by the alarm signal.

5. An apparatus as in claim 1, further comprising means for terminating an operation of the apparatus in response to the alarm signal.

6. An ink jet printing apparatus comprising:
   ink ejection means for ejecting and charging a jet of ink droplets;
   deflection means for electrostatically and variably deflecting the ink droplets;
   deflection detector means for detecting deviation of the ink droplets from a predetermined reference deflection in first and second directions which are opposite to each other; and
   control means for controlling the deflection means to perform an operation for adjusting a deflection of the ink droplets to said reference deflection, the control means comprising first means responsive to the deflection means for controlling the deflection means to vary deflection of the ink droplets toward said reference deflection in the first or second direction depending on a sensed direction of deviation, second means for controlling the first means to progressively reduce an amount of variation of deflection separately in the first and second directions, third means for sensing variation of deflection separately in the first and second directions, fourth means for terminating said operation when an amount of variation of deflection in one of the first and second directions has been reduced to a predetermined value and fifth means responsive to the third and fourth means for producing an alarm output when said operation has been terminated and the deflection has been varied in only one of the first and second directions.

7. An ink jet printing apparatus comprising:
   ink ejection means for ejecting and charging a jet of ink droplets; deflection means for electrostatically deflecting the jet by a variable amount;
   deflection adjusting means for controlling the deflection means to perform an operation for adjusting the jet deflection to a predetermined reference deflection;
   control means for sensing a failure of said operation to adjust the jet deflection to the predetermined reference deflection; and
   alarm means responsive to the control means for producing an alarm signal in response to said sensed failure.

* * * * *